3,449,284
MASTERBATCHING ELASTOMER SOLUTION
POLYMERS
Lyle W. Pollock, Bartlesville, Okla., assignor to Phillips Petroleum Company, a corporation of Delaware
Continuation-in-part of application Ser. No. 151,830, Nov. 12, 1961. This application May 20, 1963, Ser. No. 281,733
Int. Cl. C08d 7/00
U.S. Cl. 260—29.7                                    13 Claims This invention relates to a process of masterbatching solution polymers.

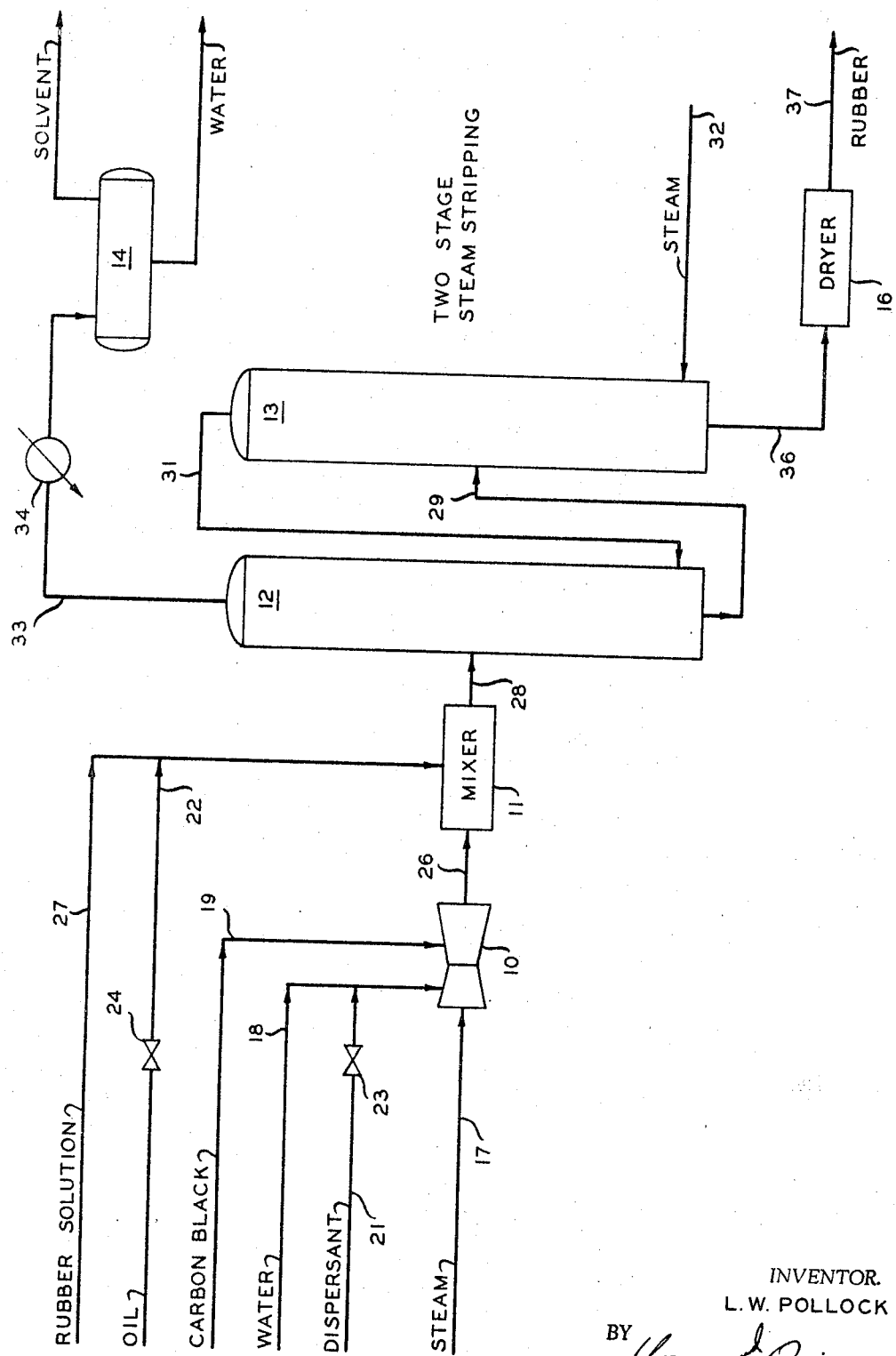

This application is a continuation-in-part of my application Ser. No. 151,830 filed Nov. 13, 1961 and now abandoned.

Hydrocarbon solvents are ordinarily employed when preparing rubbery polymers using organometal initiators. At the conclusion of the polymerization, the reaction is shortstopped, an antioxidant is added, and the polymer is recovered from the solvent. Subsequent to the removal of the solvent, the rubber can be dried and compounded. Addition of compounding ingredients can be effected on a roll mill or in an internal mixer such as a Banbury mixer. One of the most disagreeable operations in rubber processing involves the handling of carbon black, but it is widely used in rubber compounding to obtain its valuable reinforcement properties.

A first suggestion for mixing carbon black with these polymers was based upon an operation wherein the carbon black was dispersed directly into the rubber solution. Another method developed involved the use of a dispersion of the black in a hydrocarbon and the mixing of this dispersion with the rubber solution. Generally, the dispersion was prepared using the same hydrocarbon as that used in the polymerization reaction. This method, while satisfactory, involves the use of the comparatively high priced hydrocarbon which must be separated and recovered for further use.

The object of the present invention is to provide an improved process for the production of masterbatches of rubber, carbon black, and, if desired, a plasticizer or extender oil.

Accompanying and forming a part of this application is a drawing showing, in schematic form, apparatus suitable for practicing my invention.

It has now been found that carbon black can be conveniently incorporated into rubbery polymers prepared by solution polymerization to give a good dispersion of a black in the rubber by preparing a dispersion of the black in water and adding this dispersion to the polymer solution. The preparation of dispersions of carbon black in water is well known and the methods of the prior art can be used. Also known are methods of recovering the rubber from the solution and the particular method used can be one of the methods known in the art. Probably most widely used is a steam stripping operation wherein the rubber is obtained in crumb form by introducing the solution into one or more zones supplied with steam.

Briefly, the invention resides in the steps of preparing the carbon black dispersion, mixing the dispersion with a solution of the rubber, and recovering a masterbatch from this mixture. This invention was developed following my discovery that a mixture of the aqueous dispersion of the black and the solution of the rubber could be mixed and that, following this mixing, the black will migrate to the rubber solution and will be thoroughly dispersed in the rubber following coagulation of the mixture. Furnace or channel black can be used.

The amount of black in the aqueous dispersion can vary over a fairly broad range, generally from 2 to 15 weight percent, preferably 3 to 10 weight percent. The amount of black used should be less than that which produces a stiff paste. The amount of dispersion used depends, of course, upon the amount of black desired in the rubber. The range of 10 to 150 parts of black per 100 parts of rubber is commonly used. An amount within the limits of 20 to 80 parts of black on the same basis is considered to be a preferred range.

Best results are obtained when the amount of rubber in solution is in the range of 3 to 25, preferably 10 to 20, weight percent. Suitable solvents for the polymerization are known, these including the alkanes such as pentane, hexane, isooctane, cycloalkanes such as cyclohexane, methylcyclohexane, and aromatic compounds such as benzene, toluene, and the like.

In the process of my invention, a plasticizer or extender oil is frequently included in the preparation of the rubber-carbon black masterbatch. The oil can be added to the rubber solution which is then mixed with the black-water dispersion.

Suitable oils, variously called extenders, softeners, and plasticizers in the art, are well known and hundreds have been described in the literature. Representative ones include petroleum distillates; vegetable oils such as linseed and soybean oils; esters such as butyl Cellosolve pelargonate, di-n-hexyl adipate, and trioctyl phosphate; chlorinated hydrocarbons; ethers; ketones; terpenes; gum turpentine; rosin; pine tar; coal tar products such as liquids from distillates, including alkylnaphthalenes and polynuclear aromatics, and semisolids from coal tar, including low-molecular-weight polymers of coumarone-indene and related resins; liquid polymers of conjugated dienes such as liquid polybutadiene and liquid polyisoprene; and clay tower polymers.

Apparatus for practicing my invention is shown in the drawing. The principal apparatus elements shown include a jet mixer 10, a rubber solution-black dispersion mixer 11, first and second stage strippers 12 and 13, a separator 14, and a dryer 16.

The jet mixer 10 can be any suitable type wherein a dispersion of the black can be made. Within this mixer the black is struck with high velocity steam and, by reason of the impact of the entering streams, the carbon black is thoroughly and uniformly dispersed in the water. The steam is supplied by conduit 17 and the water by conduit 18. Carbon black is supplied by conduit 19. Conduit 21 is provided for the addition of a dispersant to jet mixer 10 and conduit 22 is provided for addition of oil to the rubber solution. Since these last two additives are optional, I have shown valves 23 and 24, respectively, in these lines. The dispersion produced in jet mixer 10 is passed to mixer 11 by means of conduit 26 and is therein mixed with the rubber solution supplied through conduit 27.

The mixing in mixer 11 can be carried out with a high shear pump but certain lower shear pumps are also satisfactory. The Gifford-Wood Homomixer is an example of the high shear type which has been used. Examples of the low shear pump include the Gabb Shear-Flow pump and the Nettco Flomix pump. Other mixers which can be used include steam jet mixers, pump mixers, baffle plate mixers, and the like.

As a result of this mixing, the back migrates to the hydrocarbon solution and recovery of the masterbatch is the remaining step. This can be carried out by passing the mixture through conduit 28 to stripper 12. The kettle product from stripper 12, rubber crumb dispersed in water containing a small amount of solvent, is passed by conduit 29 to stripper 13. The overhead steam-hydrocarbon vapors from stripper 13 are passed by conduit 31 to the lower end portion of stripper 12. Steam is supplied to stripper 13 through conduit 32. The overhead from stripper 12, comprising practically all of the solvent and steam, is removed by conduit 33, condensed in heat exchanger 34 and passed to separator 14 wherein the solvent and water can be separated for recycle to the process. Rubber crumb and water are removed from the bottom of stripper 13 by means of conduit 36, free water removed, and the wet crumb dried in dryer 16, and is removed as the product at 37.

The steam stripping is generally carried out in the presence of a dispersant because this will produce the product in an improved crumb form. A variety of dispersants can be used. One suitable dispersant is the product sold under the trademark Tamol 731, this being a copolymer of maleic acid and diisobutylene. The product is generally sold as an aqueous solution of the sodium salt. Broadly, this compound is an example of the broader group of suitable materials including copolymers of maleic acid or its anhydride with 1-olefins and the salts of these copolymers.

Also suitable for use as a dispersant are alkali metal salts of alkyl sulfates and alkyl benzene sulfonates. Sodium lauryl sulfate, because it is readily available commercially, is a preferred sulfate. However, salts containing 8 to 18 carbon atoms in the chain can also be used. Examples include sodium n-octyl sulfate, potassium capryl sulfate, lithium n-decyl sulfate, rubidium myristyl sulfate, cesium cetyl sulfate, and sodium stearyl sulfate. Mixtures can be used. A common source for the production of the sulfates is the mixture of fatty alcohols made by reducing the mixed fatty acids of coconut oil. This mixture consists of about 15 percent mixed $C_8$ and $C_{10}$ alcohols, 40 percent $C_{12}$ alcohol, 30 percent $C_{14}$ alcohol and 15 percent mixed $C_{16}$ and $C_{18}$ alcohols. Various cuts of this mixture are also used.

In the class of sulfonates, the sodium salt of sodium dodecylbenzene sulfonate is the most widely used. As long as the sulfonate contains an alkyl group of 8 to 18 carbon atoms it is suitable for use in this invention. Examples in addition to sodium dodecylbenzene sulfonate include lithium octylbenzene sulfonate, sodium nonylbenzene sulfonate, potassium decylbenzene sulfonate, rubidium undecylbenzene sulfonate, cesium tridecylbenzene sulfonate, lithium ethyldodecylbenzene sulfonate, sodium hexadecylbenzene sulfonate, potassium octadecylbenzene sulfonate. Mixtures can be used. In some cases the commercial product contains sulfonates with a mixture of alkyl groups. One such material is the kerylbenzene sulfonate prepared by alkylating benzene with a kerosene fraction having an average of about 14 carbon atoms per molecule.

Alkali metal lignin sulfonates are another class of suitable dispersants. The lithium, sodium, potassium, rubidium, and cesium lignin sulfonates can be used. The sodium and potassium lignin sulfonates are preferred. Sodium lignin sulfonate is presently commercially available, a process for its production being given in Industrial and Engineering Chemistry 50, No. 4, 570–576 (1958). Also described in this article are the partially desulfonated lignin sulfonates which can also be used in the process of my invention. The alkali metal lignin sulfonate is employed in the aqueous phase in an amount sufficient to give good crumb formation. Finally, zinc oxide has been used.

These dispersants can be added at any stage of the recovery process but I prefer to add them to the water in which the carbon black is dispersed. In many instances, this will improve the black dispersion as well as resulting in the production of a good crumb from the rubber.

The following examples illustrate my invention:

Example I

A series of runs were made using rubber solutions of cis 1,4-polybutadiene in toluene of varying concentrations. The polymer was formed by 95 percent cis 1,4-addition in the presence of a triisobutylaluminum, titanium tetrachloride, iodine initiator system. Rosin acid was used to shortstop the polymerization and 2,2'-methylene bis (4-methyl-6-tertiary butyl phenol) was added as an antioxidant. This solution was mixed with a dispersion of black (Philblack I) and the rubber recovered. Details of a series of runs are set forth in the following table:

| | Rubber Solution | | | Carbon Black Water Slurry | | | | Pressure, p.s.i.g. | | Temperature, °F. | | |
|---|---|---|---|---|---|---|---|---|---|---|---|---|
| | Inherent viscosity of polymer | Solids, wt. percent | Rate, lbs./min. | Solids, wt. percent | Retention 325 mesh wet screen, wt. percent | Rate, lbs./min. | Tamol 731[1] (Average phr.) | Mixer suction | Mixer discharge | Rubber solution | Black slurry | After mixer |
| Run Number: | | | | | | | | | | | | |
| 1 | 2.4 | 14.3 | 14.0 | 6.7 | | 15.1 | 0.35 | 110 | 20 | 80 | 150 | 140 |
| 2 | 2.16 | 15.5 | 5.5 | 4.5 | 0.82 | 11.0 | 0.13 | 50 | 16 | 95 | 150 | 160 |
| 3 | 2.4 | 14.8 | 9.3 | 5.2 | | 13.5 | 0.25 | 50 | 30 | 80 | 150 | 150 |
| 4 | 2.4 | 13.6 | 13.4 | 3.8 | 0.39 | 30.0 | 3.1 | 60 | 40 | 70 | 70 | 95 |
| 5 | 2.4 | 14.9 | 5.6 | 4.2 | | 11.0 | 0.10 | 60 | 35 | 70 | 70 | 105 |
| 6 | 2.4 | 14.9 | 9.4 | 4.2 | | 17.2 | 0.28 | 84 | 50 | 70 | 70 | 110 |
| 7 | 2.4 | 14.3 | 8.0 | 4.1 | 0.26 | 14.0 | 0.12 | 60 | 40 | 190 | 140 | 180 |

| | Stripper Temp., °F. | | Stripper pressure, p.s.i.g. | | Residence time, min. (each stage) | Duration of run (min.) | Particle size of crumb, inch | Fines, wt. percent (−60 mesh +200 mesh) | Carbon black in masterbatch, phr. | Carbon black in recycle water, p.p.m. | Solids in recycle water (wt. percent) |
|---|---|---|---|---|---|---|---|---|---|---|---|
| | Primary | Secondary | Primary | Secondary | | | | | | | |
| Run Number: | | | | | | | | | | | |
| 1 | 204 | 223 | 1.5 | 3.3 | 28 | 35 | .1 to .3 | | 63 / 59 | <2 | 0.20 |
| 2 | 204 | 220 | 0.5 | 2.0 | 30 | 120 | .1 to .4 | 0.4 | 64 / 71 | <2 | 0.20 / 0.15 |
| 3 | 201 | 221 | 0.7 | 2.2 | 31 | 40 | .1 to .4 | 0.6 | 60 / 60 / 65 | >10 | 0.17 / 0.17 |
| 4 | 203 | | 0.8 | | | 10 | .1 to .4 | | 35 | <10 | |
| 5 | 209 | | 0.7 | | | 20 | .2 to .4 | | 63 | <10 | 0.03 |
| 6 | 208 | | 1.3 | | | 10 | .2 to .4 | | 60 | <10 | 0.06 |
| 7 | 200 | 220 | 0.5 | 2.0 | 30 | 120 | .2 to .4 | 0.2 | 58 / 60 / 58 / 59 | 1 | 0.04 / 0.05 / 0.04 / 0.05 |

[1] Tamol 731 copolymer molecular weight 800–3,000.

As shown above, the sodium salt of diisobutylene-maleic acid copolymer was used as the dispersing agent. From this and other work, I have concluded that this dispersing agent is preferably used in an amount of 0.04 to 0.8 part by weight per 100 parts of rubber (phr.). Run 7 was made with the rubber solution at 190° F. and the black slurry at 140° F. The other runs were made with the rubber solution at room temperature. The higher temperature mixing appeared to be more effective as indicated by the fact that there was less carbon black in the recycle water during this run than during the previous runs. Concentration of black in the recycle water was determined by comparing it with samples containing known concentrations of black in water.

The present invention is not limited to the particular form of steam stripping shown.

Example II

Masterbatches prepared using the system of this invention were compounded and cured following drying of the crumb in an extruder or in a forced draft air oven. A control was run in which the compounding ingredients were added in a Banbury. Except for differences in black content as shown, the compounded stocks all contained the same recipe. Runs 1 and 2 were extruder dried while Runs 3 and 4 were dried in a forced draft oven. Run 5 is a control which was mixed in a Banbury. All curing was 45 minutes at 450° F. at 20,000 pounds on the press. Tensile strength and elongation are shown in the following table:

|  | Black Analysis (phr.) | No Extra Work | | 25 Passes Through Tight Mill | |
| --- | --- | --- | --- | --- | --- |
|  |  | Tensile Strength, p.s.i.g. | Elongation, percent | Tensile Strength, p.s.i.g. | Elongation, percent |
| Run: |  |  |  |  |  |
| 1 | 56 | 2,400 | 440 | 2,510 | 510 |
| 2 | 45 | 2,220 | 690 | 2,490 | 710 |
| 3 | 56 | 1,630 | 350 | 2,320 | 460 |
| 4 | 45 | 1,920 | 590 | 2,170 | 720 |
| 5 | 50 | 1,220 | 400 | 2,160 | 620 |

These runs establish that good dispersion is obtained by the process of this invention because the tensile strength of a thermally cured sample is a good indication of the quality of the black dispersion. As the black dispersion improves, the tensile strength increases. The values reported represent an average of several runs but the actual values are quite consistent. The tensile was run on the masterbatch as produced and then on a milled sample. Since the masterbatch will generally be processed subsequent to its production in a Banbury or roll mill, the tensile strength of the milled sample is the best indicator of the quality of the dispersion. The arrangement in the table of Example II is arranged in descending order according to the tensile of the milled sample. The following conclusions are apparent: Runs 1-4 (the invention) are significantly better than the control, extruder dried mixtures (Runs 1 and 2) have higher tensiles than oven dried material (Runs 3 and 4) because of the work added in the extruder.

Example III

An ethylene-propylene-dicyclopentadiene terpolymer was masterbatched with 50 phr. of Philblack O (HAF black). The polymer was dissolved in toluene to make a 10 percent solids cement. The black was slurried in water (5 percent solids) using a Waring blender to obtain a smooth slurry. The rubber cement and slurry were mixed and steam stripped after which the crumb was dried in a vacuum oven at 50° C.

The polymer had been prepared in the following recipe:

| | |
|---|---|
| Toluene _____ ml_ | 3200 |
| Ethylene _____ gr_ | 80 |
| Propylene _____ gr_ | 200 |
| Dicyclopentadiene _____ mmoles_ | 120 |
| Ethylaluminum sesquichloride _____ do_ | 4.8 |
| Vanadium tetrachloride _____ do_ | 1.6 |

Polymerization temperature was 80° F.

The properties of the polymer were:

| | |
|---|---|
| Inherent viscosity | 1.12 |
| Gel | 0 |
| Propylene, percent | 43 |
| Unsaturated, percent | 1.18 |
| Mooney viscosity, ML-4 at 212° F. | 61 |

The black masterbatch was compared to a mill mixed control using the following recipe (parts by weight):

| | Masterbatch | Polymer |
|---|---|---|
| Masterbatch | 150 | — |
| Polymer | — | 100 |
| Philblack O | — | 50 |
| Zinc oxide | 5 | 5 |
| Stearic acid | 1 | 1 |
| Flexamine [1] | 1 | 1 |
| Circosol 2-XH [2] | 20 | 20 |
| Sulfur | 1.5 | 1.5 |
| Captax [3] | 0.5 | 0.5 |
| Monex [4] | 1.5 | 1.5 |

[1] Mixture containing 65 per cent of a diarylamine-ketone reaction product and 35 per cent of N,N'-diphenyl-p-phenylene diamine.
[2] Petroleum hydrocarbon softeners, containing hydrocarbons of high molecular weight, in the form of a heavy, viscous, transparent, pale green, odorless liquid of low volatility; specific gravity, 0.940; Saybolt Universal viscosity at 100° F., about 2000 seconds.
[3] 2-mercaptobenzothiazole.
[4] Tetramethyl-thiuram-monosulfide.

The stocks were cured for 30 minutes at 320° F.

The following results were obtained:

| | Masterbatch | Dry Mix |
|---|---|---|
| 300% Modulus, p.s.i. | 2,030 | 2,010 |
| Tensile, p.s.i. | 3,170 | 2,510 |
| Elongation, percent | 420 | 350 |
| Shore Hardness | 70 | 72 |
| $\Delta T$, ° F. | 60.2 | 60.2 |
| Resilience | 68.2 | 68.5 |

Visual inspection indicated an excellent black dispersion in the masterbatch.

In this system, it is possible to recover rubber crumb from various types of rubber in solution. One type of these rubbery polymers is prepared by polymerizing a monomer system containing a single monomer or a mixture containing at least a major portion of conjugated dienes containing 4 to 8 carbon atoms. Examples of conjugated dienes which can be used include, 1,3-butadiene, isoprene, 2,3-dimethylbutadiene, 2-methoxybutadiene, 1,3-hexadiene, and 1,3-octadiene. These conjugated dienes can be polymerized either along or in admixture with each other and/or with one or more other compounds containing an active $CH_2=C<$ group which are copolymerizable therewith. Suitable monomers containing this group include styrene, acrylonitrile, methyl acrylate, methyl methacrylate, vinyl chloride, methyl vinyl ether, ethylene, propylene, 1-butene, 1-propene, 1-octene and the like. An important group of polymers are those with substantially all one type of structure such as cis-polybutadiene, trans-polybutadiene, cis-polyisoprene and trans-polyisoprene. However, polymers containing substantial amounts of two or more types of configuration, such as polybutadiene formed by approximately equal amounts of cis and trans 1,4-addition, can be treated according to this invention.

A large number of initiator systems are suitable for the production of the polymers.

One type of initiator system is a two or more component catalyst wherein one component is an organometal compound, including those where one or more organo groups is replaced by a halogen; a metal hydride; or a metal of Group I, II or III; and the second component is a Group IV to VI compound, e.g., salt or alcoholate. This type of initiator system is fully described with a group of examples in columns 5 through 8 of Patent 2,886,561 dated May 12, 1959.

Another initiator system which is suitable involves the use of a compound of the formula $R(Li)_x$, wherein R is a hydrocarbon radical selected from the group consisting of aliphatic, cycloaliphatic and aromatic radicals and combinations of these radicals and $x$ is an integer from 1 to 4, inclusive. The aliphatic and cycloaliphatic radicals can be saturated or contain olefinic unsaturation.

Another general type of rubber which can be used in the practice of this invention comprises the copolymers of ethylene and at least one alpha-olefin having the structure $RCH=CH_2$ where R is a $C_1$ to $C_8$ alkyl radical and the amount of combined ethylene is at least 20, and preferably 30, weight percent of the total polymer. Copolymers of ethylene and propylene have received the greatest attention to the present. Such copolymers can be distinguished from thermoplastic ethylene-propylene copolymers in that they are at least 80 percent soluble in toluene at 30° C. and have a Shore D hardness not greater than 20. Small quantities of non-conjugated diolefins are frequently incorporated in the recipe to provide olefinic unsaturation in the polymer thereby permitting the use of conventional sulfur-type curing systems. Suitable diolefins include dicyclopentadiene, 1,4-pentadiene, 1,5-hexadiene, 2-methyl-1,5-hexadiene, 1,7-octadiene, 1,9-decadiene, and 1,19-eicosadiene.

As many possible embodiments can be made of this invention without departing from the scope thereof, it is to be understood that all matter herein set forth is to be interpreted as illustrative and not as unduly limiting the invention.

I claim:

1. Process for agglutinating carbon black with rubber which comprises mixing an aqueous slurry of carbon black containing 2 to 15 parts of black per 100 parts of water with a solution of the rubber in an organic solvent and thereafter recovering an aqueous dispersion of a coagulum comprising the rubber having substantially all of the carbon black dispersed therein.

2. A method comprising dispersing 2 to 15 parts of carbon black in 100 parts of water, mixing the resulting black dispersion with a solution of rubber in a liquid which is a solvent for said rubber but not for said black, and stripping the rubber solvent from the mixture thereby obtaining an aqueous dispersion of rubber-black masterbatch wherein the carbon black has migrated from the water to the rubber, said rubber being a hydrocarbon.

3. Process for agglutinating carbon black with rubber which comprises mixing an aqueous slurry of the carbon black containing 2 to 15 parts of black per 100 parts of water with a solution of the rubber in an organic solvent so that the carbon black migrates from the aqueous slurry to the solution of rubber in organic solvent and thereafter desolventizing the mixture of produce an aqueous dispersion of a coagulum comprising the rubber having substantially all of the carbon black of the aqueous slurry dispersed therein.

4. A method comprising dispersing 2 to 15 parts of carbon black in 100 parts of water, mixing the resulting black dispersion with a solution of rubber in a liquid which is a solvent for said rubber but not for said black, and stripping the rubber solvent from the mixture thereby obtaining an aqueous dispersion of a rubber-black masterbatch, said rubber being a rubbery polymer of a conjugated diene.

5. The method of claim 4 wherein said rubber is selected from the group consisting of cis-1,4-polybutadiene, trans-1,4-polybutadiene, cis-1,4-polyisoprene, and trans-1,4-polyisoprene.

6. The method of claim 1 wherein said rubber is prepared by polymerizing a monomer mixture containing ethylene and an alpha olefin containing 3 to 10 carbon atoms.

7. The method of claim 1 wherein said rubber is an ethylene-propylene-dicyclopentadiene terpolymer.

8. A method comprising dispersing carbon black and a rubber plasticizer in water, the dispersion containing 2 to 15 parts of black per 100 parts of water, mixing the resulting dispersion with a solution of rubber in a liquid which is a solvent for said rubber but not for said black, and passing the resulting mixture to a steam stripping zone wherein the rubber solvent is removed thereby producing an aqueous dispersion of rubber-black-plasticizer masterbatch in crumb form, and rubber being a rubbery polymer of a conjugated diene.

9. The method of claim 1 wherein said water contains a dispersant.

10. A method comprising dispersing carbon black in water in an amount of 2 to 15 parts of black per 100 parts of water, mixing the resulting dispersion with a solution of rubber containing 3 to 25 weight percent rubber in a liquid which is a solvent for said rubber but not for said carbon black, the amount of said black dispersion being sufficient to provide 10 to 150 parts of black per 100 parts of rubber, passing the resulting mixture to a steam stripping zone thereby producing an aqueous dispersion of a rubber-black masterbatch in crumb form, said rubber being a rubbery polymer of a conjugated diene.

11. A method comprising dispersing carbon black in water in an amount of 3 to 10 parts of black per 100 parts of water, mixing the resulting dispersion with a solution of rubber containing 10 to 20 weight percent rubber in a liquid which is a solvent for said rubber but not for said carbon block, the amount of said black dispersion being sufficient to provide 20 to 60 parts of black per 100 parts of rubber, passing the resulting mixture to a steam stripping zone thereby producing an aqueous dispersion of rubber-black masterbatch in crumb form, said rubber being a rubbery polymer of a conjugated diene.

12. The process of claim 1 wherein said rubber is selected from the group consisting of homopolymers of conjugated dienes, copolymers of conjugated dienes with copolymerizable monomers containing an active

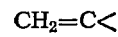

group, and polymers of ethylene and at least one higher 1-olefin.

13. Process for incorporating carbon black in a rubber which comprises simple mixing of a low viscosity slurry of carbon black in water with a solution of the rubber in an organic solvent, maintaining two separate liquid phases to ensure the substantially complete migration of the carbon black from the aqueous slurry to the solution of rubber in organic solvent and thereafter removing the organic solvent and the water from the mixture to produce coagulum comprising the rubber having substantially all of the carbon black of the aqueous slurry dispersed therein.

References Cited

UNITED STATES PATENTS 2,986,547   5/1961   Jefts et al. _____ 260—41

ALLAN LIEBERMAN, *Primary Examiner.*

U.S. Cl. X.R.

260—41.5, 33.6, 763